(12) United States Patent
Zehavi et al.

(10) Patent No.: US 9,327,472 B1
(45) Date of Patent: May 3, 2016

(54) COMPOSITE SUBSTRATE

(71) Applicant: Integrated Photovoltaics, Inc., San Jose, CA (US)

(72) Inventors: Sharone Zehavi, San Jose, CA (US); Willibrordus Gerardus Maria van den Hoeck, San Jose, CA (US)

(73) Assignee: Integrated Photovoltaics, Inc., San Jose, CA (US)

( * ) Notice: Subject to any disclaimer, the term of this patent is extended or adjusted under 35 U.S.C. 154(b) by 6 days.

(21) Appl. No.: 13/946,936

(22) Filed: Jul. 19, 2013

(51) Int. Cl.
*B32B 3/26* (2006.01)

(52) U.S. Cl.
CPC ..................................... *B32B 3/263* (2013.01)

(58) Field of Classification Search
USPC ......... 428/216, 336, 697, 698, 699, 701, 702, 428/704
See application file for complete search history.

(56) References Cited

U.S. PATENT DOCUMENTS

| | | | | |
|---|---|---|---|---|
| 4,268,569 | A * | 5/1981 | Hale | 428/332 |
| 6,162,543 | A | 12/2000 | Dubots et al. | |
| 6,251,819 | B1 | 6/2001 | Prin et al. | |
| 6,555,031 | B2 | 4/2003 | Gadkaree et al. | |
| 6,613,251 | B2 | 9/2003 | Savel, III | |
| 7,214,342 | B2 | 5/2007 | Lynen et al. | |
| 7,410,883 | B2 * | 8/2008 | Gadkaree | 438/455 |
| 7,479,249 | B2 | 1/2009 | Gahr et al. | |
| 7,510,760 | B2 * | 3/2009 | Malshe et al. | 428/698 |
| 7,682,534 | B2 | 3/2010 | Siegel et al. | |
| 7,789,331 | B2 | 9/2010 | Zehavi et al. | |
| 8,043,694 | B2 | 10/2011 | His et al. | |
| 8,107,270 | B2 | 1/2012 | Scheuerlein et al. | |
| 8,110,419 | B2 | 2/2012 | Zehavi et al. | |
| 8,129,300 | B2 | 3/2012 | His et al. | |
| 8,153,528 | B1 | 4/2012 | Hendler et al. | |
| 8,168,284 | B2 | 5/2012 | Nealey et al. | |
| 8,178,165 | B2 | 5/2012 | Jin | |
| 8,207,013 | B2 | 6/2012 | Yang | |
| 8,226,838 | B2 | 7/2012 | Cheng et al. | |
| 8,253,528 | B2 | 8/2012 | Blaker | |
| 8,476,660 | B2 | 7/2013 | Zehavi et al. | |
| 2010/0139841 | A1 | 6/2010 | Siegel et al. | |
| 2010/0237050 | A1 | 9/2010 | Zehavi | |
| 2010/0280261 | A1 | 11/2010 | Howard et al. | |
| 2010/0304035 | A1 | 12/2010 | Zehavi et al. | |
| 2011/0041903 | A1 | 2/2011 | Zehavi et al. | |
| 2011/0045630 | A1 | 2/2011 | Zehavi et al. | |
| 2011/0059843 | A1 | 3/2011 | Howard | |
| 2011/0059844 | A1 | 3/2011 | Bryden et al. | |
| 2011/0136659 | A1 | 6/2011 | Allen et al. | |
| 2011/0189405 | A1 | 8/2011 | Zehavi et al. | |

(Continued)

OTHER PUBLICATIONS

Weiss, Dirk; "Nanoimprinting for diffractive light trapping in solar cells"; J.Vac.Sci. Technol.B28(6), Nov./Dec. 2010.
Weiss, Dirk; "All-inorganic thermal nanoimprint process"; J.Vac.Sci. Technol.B28(4), Jul./Aug. 2010.
Wu, Xiuwen, et al.;"Thermal Conductivity and Microstructure Properties of SiC Ceramic derived from Silicon Carbide Powder"; New JI Glass and Ceramics, 2013, 3, 43.

(Continued)

*Primary Examiner* — Archene Turner
(74) *Attorney, Agent, or Firm* — Fernandez & Associates, LLP

(57) ABSTRACT

A composite substrate with a degree of porosity, optionally of a carbon based material, and at least a first layer over coating the first portion by a predetermined amount, including at least a portion of the interior surfaces of the first portion and reducing the porosity of the composite substrate by a predetermined amount. The structure and composition of the composite substrate enable functionalities in different classes of completed devices ranging from energy conversion and storage, chemical processing and filtration.

14 Claims, 2 Drawing Sheets

(56) References Cited

U.S. PATENT DOCUMENTS

| | | |
|---|---|---|
| 2011/0192461 A1 | 8/2011 | Hendler et al. |
| 2012/0077006 A1 | 3/2012 | Worsley et al. |
| 2012/0186574 A1 | 7/2012 | Han et al. |
| 2012/0255607 A1 | 10/2012 | Roy-Mayhew et al. |
| 2012/0273792 A1 | 11/2012 | Hendler et al. |
| 2013/0036719 A1 | 2/2013 | Noguchi et al. |
| 2013/0078508 A1 | 3/2013 | Tolbert et al. |
| 2013/0104973 A1 | 5/2013 | Jee et al. |

OTHER PUBLICATIONS

"Manufacturing Process and Material Properties of Carbon and Graphite Materials"; http://www.schunkgraphite.com/sixcms/media.php/1698/Kohlenstoff-Broschuere_GB.pdf [Jul. 16, 2013].

Wu, Hui, et al.;"Designing nanostructured Si anodes for high energy lithium ion batteries"; Nano Today (2012), http://dx.doi.org/10.1016/j.nantod.2012.08.004.

* cited by examiner

Figure 4    400
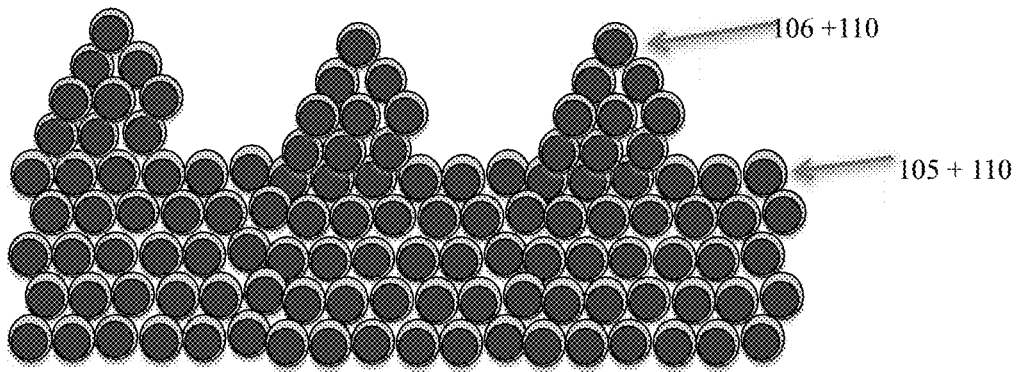
Figure 5    500
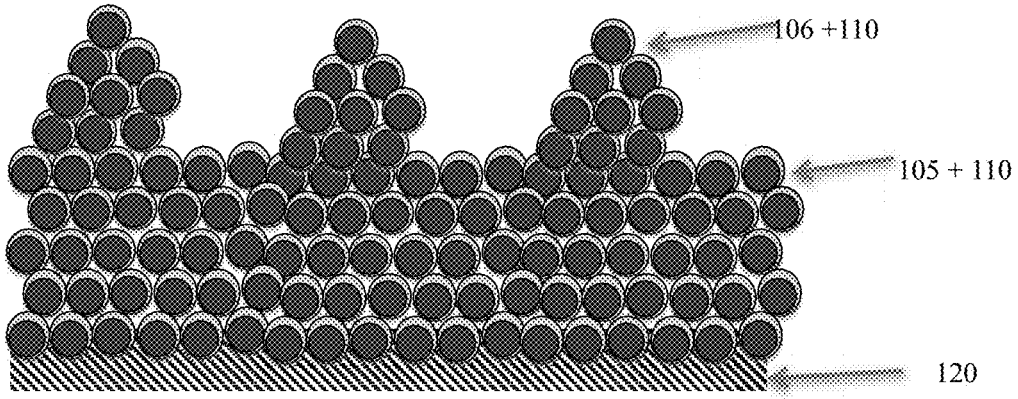

COMPOSITE SUBSTRATE

CROSS-REFERENCE TO RELATED APPLICATIONS

This application is related in part to U.S. application Ser. Nos. 12/789,357, 13/010,700, 13/019,965, 13/077,870, 13/104,881, 13/272,073, 13/273,175, 13/300,046, 13/708, 454 U.S. 2010/0304035, U.S. 2011/0045630, U.S. 2011/0192461, U.S. 2012/0247543, US 2012/0273792, U.S. Pat. No. 7,789,331, U.S. Pat. No. 8,110,419, U.S. Pat. No. 8,153, 528, U.S. Pat. No. 8,253,528, and U.S. Pat. No. 8,476,660 all owned by the same assignee and all incorporated by reference in their entirety herein. Additional technical explanation and background is cited in the referenced material. US 2012/0273792

BACKGROUND OF THE INVENTION

1. Field of the Invention

The invention discloses composition of matter for a composite substrate comprising layers of different composition, and optionally features, wherein the composite substrate has utility in disparate devices and manufacturing processes.

2. Description of Related Art

Background material is found in the following references; all references are incorporated by reference herein in their entirety. References: U.S. Pat. No. 8,207,013; U.S. 8,226, 8338; U.S. Pat. No. 8,107,270; U.S. Pat. No. 8,168,284; U.S. Pat. No. 8,178,165; U.S. Pat. No. 6,162,543; U.S. Pat. No. 6,251,819; U.S. Pat. No. 6,555,031; U.S. Pat. No. 8,043,694; U.S. Pat. No. 8,129,300; U.S. Pat. No. 7,214,342; U.S. Pat. No. 7,682,534; U.S. Pat. No. 7,479,249; U.S. Pat. No. 6,613, 251; U.S. Patent Publications: 2010/0280261; 2010/0280261; 2011/0059843; 2011/0059844; 2011/0136659; 2012/0077006; 2012/0186574; 2012/0255607; 2013/0104973; 2013/0078508; 2013/0036719; 20100139841; WEISS, DIRK; "Nanoimprinting for diffractive light trapping in solar cells"; J. Vac. Sci. Technol. B28(6), November/December 2010; WEISS, DIRK; "All-inorganic thermal nanoimprint process"; J. Vac. Sci. Technol. B28(4), July/August 2010; WU, XIUWEN, et al.; "Thermal Conductivity and Microstructure Properties of SiC Ceramic derived from Silicon Carbide Powder"; New Jl Glass and Ceramics, 2013, 3, 43; WU, HUI, et al.; "Designing nanostructured Si anodes for high energy lithium ion batteries"; Nano Today (2012); http://dx.doi.org/10.1016/j.nantod.2012.08.004; "Manufacturing Process and Material Properties of Carbon and Graphite Materials"; www.schunkgraphite.com/sixcms/media.php/1698/Kohlenstoff-Broschuere_GB .pdf [Jul. 16, 2013].

SUMMARY OF THE INVENTION

The instant invention discloses composition of matter for a composite substrate with a degree of porosity comprising a first portion, optionally of a carbon based material, and at least a first layer over coating the first portion by a predetermined amount, including at least a portion of the interior surfaces of the first portion, optionally including features, and reducing the porosity of the composite substrate by a predetermined amount. The structure and composition of the composite substrate enable enhanced functionalities in different classes of completed devices ranging from energy conversion and storage, chemical processing and filtration.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 4 is a schematic view of the first portion of a composite substrate with added features showing a first layer and a degree of porosity.

FIG. 5 is a schematic view of the first portion of a composite substrate with added features showing a first layer and a degree of porosity and a conductive layer on the second surface of the first portion.

DETAILED DESCRIPTION OF THE PREFERRED EMBODIMENTS

Figure 1:
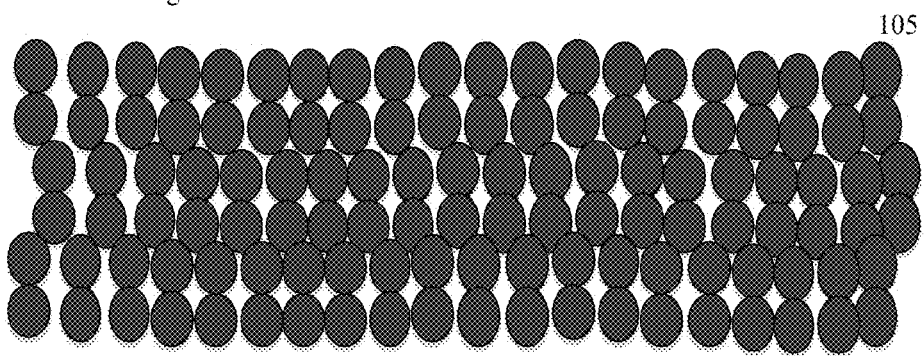
FIG. 1 is a schematic view of the first portion of a composite substrate showing a degree of porosity.

In some embodiments a composite substrate comprises a first portion comprising first and second surfaces of first composition of $X_aY_b$, wherein the first portion has a porosity between about 30% and about 90%; and a first layer of second composition coating at least a majority of the first portion's first surface area and interior such that the bulk resistivity of the composite substrate is less than 50 ohm-cm; in some embodiments a composite substrate is not very conductive, having a bulk resistivity of greater than about 100 ohm-cm. In some embodiments the first portion of a composite substrate comprises a composition X chosen from a group consisting of aluminum, silicon, and the transition metals and composition Y chosen from a group consisting of carbon, oxygen and nitrogen; wherein a and b are ≤3. In some embodiments the second composition is chosen from a group consisting of Group III, IV, and V elements and Ti, Ta, Ni, W, Zr, Cr, O, N, Cu and Al. and the thickness of the layer is greater than 2 nanometers and less than 5 micrometers. In some embodiments a composite substrate comprises a second layer of third composition in contact with at least a portion of the second layer such that the thickness of the second layer is greater than about 10 nanometers and less than about 100 micrometers wherein the third composition is chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics.

In some embodiments a composite substrate comprises a first surface of the first portion having features imprinted across the first surface and the features have a height above the first surface of at least one micron wherein the imprinted features are over-coated by the first layer. In some embodiments a composite substrate comprising first and second surfaces of first composition over-coated by a first layer of second composition wherein the first layer extends throughout the first portion and is present on the second surface such that the porosity of the composite substrate is between about 10% and 80%. In some embodiments a composite substrate comprises a second layer of third composition in contact with at least a portion of the second layer; optionally, the second layer may be adjacent the first or second surface of the first portion, separated by the first layer from the first portion. In some embodiments a composite substrate comprises a third layer of fourth composition in contact with at least a portion of the second layer; optionally, the third layer may be overlaying the first or second surface of the first portion, separated by the first layer and/or second layer from the first portion. In some embodiments a composite substrate comprises a third layer of fourth composition wherein the fourth composition is chosen from a group consisting of Group III, IV, and V elements such that the third layer has a thickness between about 3 and 50 microns. In some embodiments a composite substrate comprises first and second surfaces over-coated by a first, and/or second and/or third layers wherein the compositions of the first, and/or second and/or third layers may vary in the direction of deposition such that the last deposited portion of the first, and/or second and/or third layers may have a composition different than the first deposited portion.

Figure 2:
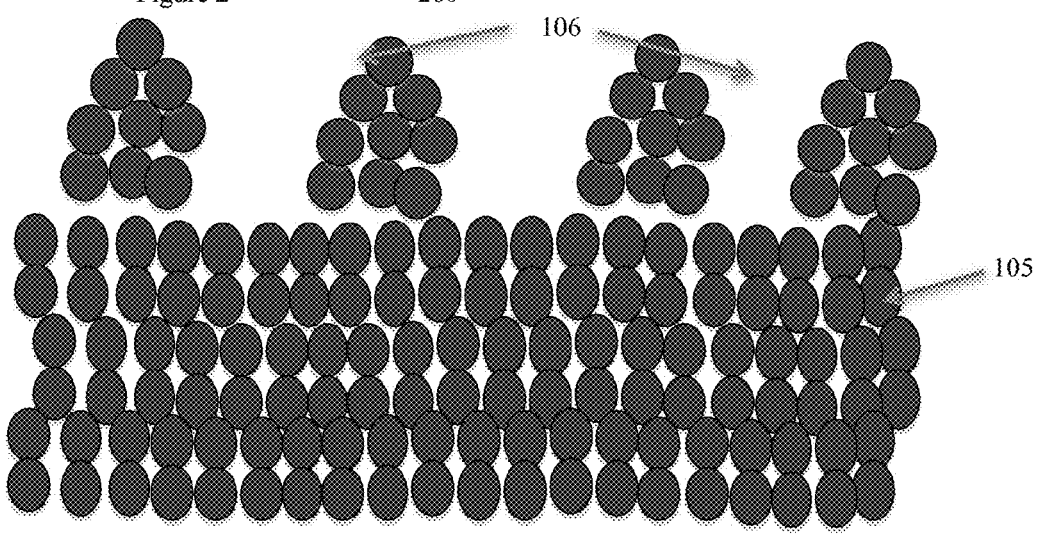
FIG. 2 is a schematic view of the first portion of a composite substrate showing imprinted features and a degree of porosity.

In some embodiments the first portion is a carbon based, optionally flexible, mat starting out in a "green" or uncured state. Material suitable for carrying out the invention is described in detail in the "Description of Related Art" section. Optionally, a pattern of figures may be imprinted upon the green state mat material; in some embodiments the figures are greater than one micron in each dimension, including vertical. The imprinted features are chosen from a group consisting of tetrahedra, cylinders, solid pyramids, cubes, spheroids, rectangular solids, rows and channels and other shapes of interest. After imprinting or embossing or other "feature-forming" operation the green state mat material is cured at an appropriate temperature and atmosphere; a calcining and/or carbonization step may be appropriate depending upon whether binders are present. At this point the "green mat material" is referred to as the "first portion", 105 of FIG. 1, of a composite material 100. FIG. 2 is a schematic view of 200, being 105 with features 106 added thereto by imprinting or tape casting or other process known to one knowledgeable in the art.

Figure 3:
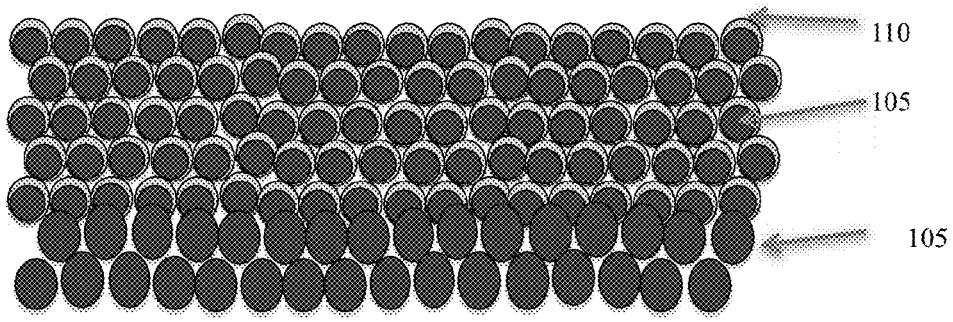
FIG. 3 is a schematic view of the first portion of a composite substrate showing a first layer and a degree of porosity.

A first layer, 110 of FIG. 3, is deposited by one or more deposition processes such as chemical vapor deposition, CVD, plasma enhanced chemical vapor deposition, PECVD, physical vapor deposition, PVD, atomic layer deposition, ALD, low pressure chemical vapor deposition, LPCVD, or other deposition process known to one knowledgeable in the art. A first layer 110 over coats a fraction of the first portion 105 creating structure 300 of FIG. 3; in some embodiments, not shown, the first layer covers all portions of the first portion, including accessible voiding beneath the physical surface. In FIG. 4 structure 400 shows over coating of features 106 and first portion 105 by first layer 110. In some embodiments roll-to-roll equipment from Mustang Solar, mustang-solar.com, may be used for various depositions.

In some embodiments a composite substrate comprises a first portion comprising a first and second surface of first composition of $X_aY_b$, wherein the first portion has a porosity between about 30% and about 90%; and a first layer of second composition coating at least 90% of the first portion's first surface area and interior such that the bulk resistivity of the composite substrate is less than 5 ohm-cm; optionally, X is chosen from a group consisting of aluminum, silicon, and the transition metals and Y is chosen from a group consisting of carbon, oxygen and nitrogen and a and b are ≤3; optionally, the second composition is chosen from a group consisting of Group III, IV, and V elements and Ti, Ta, Ni, W, Cr, O, N, Cu, Zr and Al. and the thickness of the first layer above the first portion is greater than 2 nanometers and less than 2 micrometers; optionally, the first surface of the first portion has features imprinted across the first surface and the features have a height above the first surface of at least one micron wherein the imprinted features are over-coated by the first layer; optionally, a composite substrate further comprises a second layer of third composition in contact with at least a portion of the first layer such that the thickness of the third layer is greater than 10 nanometers and less than 50 micrometers; optionally, the third composition is chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics; optionally, the second layer comprises at least three layers wherein two layers in contact are operable as an active region of a photovoltaic device.

In some embodiments a composite substrate comprising first or second layers, optionally features, may comprise layers recrystallized according to processes disclosed in U.S. application Ser. No. 13/234,316 wherein the grain size in a lateral dimension of at least a portion of one or more layers is greater than one micron; optionally, greater than 5 microns; optionally, greater than 20 microns.

In some embodiments a composite substrate comprising a first portion 105 and first layer 110 has a conductive layer 120 on the second surface of the first portion as shown in FIG. 5. The composition of the conductive layer is chosen from a group consisting of Group III, IV, and V elements and Ti, Ta, Ni, W, Cr, O, N, Cu, Zr and Al. In some applications two composite substrates comprising conductive layers may be bonded together with the conductive layers in contact such that the two first layers are outwardly facing.

In some embodiments a composite substrate comprises a first portion comprising a first and second surface of first composition of $X_aY_b$, wherein X is chosen from a group consisting of aluminum, silicon, and the transition metals and Y is chosen from a group consisting of carbon, oxygen and nitrogen and a and b are ≤3 wherein the first portion has a porosity between about 30% and about 90% wherein the first surface has a plurality features and the features have a height above the first surface of at least one micron; and a first layer of second composition coating the first portion's first surface area and interior such that the bulk resistivity of the composite substrate is greater than 100 ohm-cm and such that the imprinted features are over coated by the first layer; wherein the second composition is chosen from a group consisting of Group III, IV, and V elements and Ti, Ta, Ni, W, Cr, O, N, Cu, Zr and Al and the thickness of the first layer above the first portion and features is greater than 2 nanometers and less than 50 micrometers; optionally, a composite substrate further comprises a second layer of third composition chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics in contact with at least a portion of the first layer such that the thickness of the third layer is greater than 10 nanometers and less than 50 micrometers; optionally, a composite substrate comprises a second layer comprising a plurality of layers of different compositions; optionally, a composite substrate comprises a second layer in contact with at least a portion of the second surface of the first portion of fourth composition chosen from a group consisting of Group IV elements and Ti, Ta, Ni, W, Cr, O, N, Cu, Zr and Al and the thickness of the second layer from the second surface of the first portion is greater than 10 nanometers and less than 50 micrometers.

For purposes herein transition metals are considered as any element in the d-block of the periodic table which includes groups 3 to 12 on the periodic table; the f-block lanthanide and actinide series are also considered transition metals; sometimes called "inner transition metals".

In the previous description, numerous specific details are set forth to provide a thorough understanding of the present invention. However, it will be apparent to one of ordinary skill in the art that the invention may be practiced without these particular details. In other instances, methods, procedures, and components that are well known to those of ordinary skill in the art are not described in detail to avoid obscuring aspects of the present invention.

It will be understood that when a layer is referred to as being "on top of" or "over" another layer, it can be directly on the other layer or intervening layers may also be present. In contrast, when a layer is referred to as "contacting" another layer, there are no intervening layers present. Similarly, it will be understood that when a layer is referred to as being "below" another layer, it can be directly under the other layer or intervening layers may also be present.

It will also be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer, without departing from the scope of the present invention.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entirety.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A composite planar substrate comprising;
a first portion comprising a first and second surface of first composition of $X_aY_b$, wherein the first portion has a porosity between about 30% and about 90%; and
a first layer of second composition coating the first portion's first surface and interior such that the bulk resistivity of the composite substrate is less than 50 ohm-cm wherein X is chosen from a group consisting of aluminum, silicon, and the transition metals and Y is chosen from a group consisting of carbon, oxygen and nitrogen and a and b are ≤3.

2. The composite substrate of claim 1 wherein the second composition is chosen from a group consisting of Group III, IV, and V elements and Ti, Ta, Ni, W, Cr, O, N, Cu, Zr and Al and the thickness of the first layer above the first portion is greater than 2 nanometers and less than 5 micrometers.

3. The composite substrate of claim 2 wherein the first surface of the first portion has features imprinted across the first surface and the features have a height above the first surface of at least one micron wherein the imprinted features are over-coated by the first layer.

4. The composite substrate of claim 3 further comprising a second layer of third composition in contact with at least a portion of the first layer such that the thickness of the third layer is greater than 10 nanometers and less than 50 micrometers.

5. The composite substrate of claim 4 wherein the third composition is chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics.

6. The composite substrate of claim 5 wherein the second layer comprises at least three layers and at least one layer is of composition different than the other two.

7. A composite substrate comprising;
a first portion comprising a first and second surface of first composition of $X_aY_b$, wherein X is chosen from a group consisting of aluminum, silicon, and the transition metals and Y is chosen from a group consisting of carbon, oxygen and nitrogen and a and b are ≤3 wherein the first portion has a porosity between about 30% and about 90% wherein the first surface has a plurality features and the features have a height above the first surface of at least one micron; and
a first layer of second composition coating the first portion's first surface area and interior such that the bulk resistivity of the composite substrate is less than 50 ohm-cm and such that the imprinted features are over coated by the first layer; wherein the second composition is chosen from a group consisting of Group III, IV, and V elements and Ti, Ta, Ni, W, Cr, O, N, Cu, Zr and Al and the thickness of the first layer above the first portion and features is greater than 2 nanometers and less than 50 micrometers.

8. The composite substrate of claim 7 further comprising a second layer of third composition chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics in contact with at least a portion of the first layer such that the thickness of the third layer is greater than 10 nanometers and less than 50 micrometers.

9. The composite substrate of claim 7 wherein the second layer comprises a plurality of layers of different compositions.

10. The composite substrate of claim 7 further comprises a second layer in contact with at least a portion of the second surface of the first portion of fourth composition chosen from a group consisting of Group IV elements and Ti, Ta, Ni, W, Cr, O, N, Cu, Zr and Al and the thickness of the second layer from the second surface of the first portion is greater than 10 nanometers and less than 50 micrometers.

11. A composite substrate comprising;
a first portion comprising a first and second surface of first composition of $X_aY_b$, wherein X is chosen from a group consisting of aluminum, silicon, and the transition metals and Y is chosen from a group consisting of carbon, oxygen and nitrogen and a and b are ≤3 wherein the first portion has a porosity between about 30% and about 90% wherein the first surface has a plurality features and the features have a height above the first surface of at least one micron; and a first layer of second composition coating the first portion's first surface area and interior such that the bulk resistivity of the composite substrate is greater than 100 ohm-cm and such that the imprinted features are over coated by the first layer; wherein the second composition is chosen from a group consisting of Group III, IV, and V elements and Ti, Ta, Ni, W, Cr, O, N, Cu, Zr and Al and the thickness of the first layer above the first portion and features is greater than 2 nanometers and less than 50 micrometers.

12. The composite substrate of claim 11 further comprising a second layer of third composition chosen from a group consisting of Group III, IV, and V elements, $Si_xO_y$, $Si_xN_z$, $Si_xO_yN_z$, aluminum oxide, TiC, TiN, TiO, TaN, ZrN, nitrides and ceramics in contact with at least a portion of the first layer such that the thickness of the third layer is greater than 10 nanometers and less than 50 micrometers.

13. The composite substrate of claim 11 wherein the second layer comprises a plurality of layers of different compositions.

14. The composite substrate of claim 11 further comprises a second layer in contact with at least a portion of the second surface of the first portion of fourth composition chosen from a group consisting of Group IV elements and Ti, Ta, Ni, W, Cr, O, N, Cu, Zr and Al and the thickness of the second layer from the second surface of the first portion is greater than 10 nanometers and less than 50 micrometers.

* * * * *